(12) United States Patent
Robert

(10) Patent No.: US 6,276,393 B1
(45) Date of Patent: *Aug. 21, 2001

(54) POSITION SENSING SYSTEM FOR BUTTERFLY VALVES

(75) Inventor: Raoul W. Robert, Baton Rouge, LA (US)

(73) Assignee: T&R Solutions, Inc., Prairieville, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/772,238

(22) Filed: Jan. 29, 2001

Related U.S. Application Data

(63) Continuation of application No. 09/540,848, filed on Mar. 31, 2000, now Pat. No. 6,182,690.

(51) Int. Cl.$^7$ .................................................. F16K 37/00
(52) U.S. Cl. ............................................ 137/554; 116/277
(58) Field of Search ................................. 137/554, 553; 251/305; 116/277

(56) References Cited

U.S. PATENT DOCUMENTS

| | | | | |
|---|---|---|---|---|
| 4,570,118 | * | 2/1986 | Tomczak et al. | 324/208 |
| 5,564,470 | * | 10/1996 | Denmark et al. | 137/554 |
| 6,067,961 | * | 5/2000 | Kato | 251/305 X |
| 6,119,652 | * | 9/2000 | Waples et al. | 251/305 X |
| 6,182,690 | * | 2/2001 | Robert | 137/554 |

* cited by examiner

*Primary Examiner*—Kevin Lee
(74) *Attorney, Agent, or Firm*—Michael A. O'Neil

(57) ABSTRACT

A butterfly valve comprises a valve housing, a valve member mounted within the valve housing, and a valve stem supporting the valve member within the valve housing for rotation between open and closed positions. At least one magnet is mounted on the valve stem for rotation with the valve member. At least one sensor is positioned for actuation by the magnet to indicate that the valve member is in its fully closed position.

2 Claims, 1 Drawing Sheet

POSITION SENSING SYSTEM FOR BUTTERFLY VALVES

This application is a continuation of Ser. No. 09/540,848 filed Mar. 31, 2000 U.S. Pat. No. 6,182,690.

TECHNICAL FIELD

The present invention relates generally to position sensing systems, and more particularly to a position sensing system particularly adapted for use in conjunction with butterfly valves.

BACKGROUND AND SUMMARY OF THE INVENTION

Butterfly valves are employed in pipelines and other piping applications to control the flow of liquids through the piping. In a typical application, the butterfly valve comprises a round, disk-shaped valve member which is mounted on a valve stem. The valve stem is rotated to position the valve member either perpendicularly to the flow of liquid through the piping thereby closing the valve, or parallel to the flow of liquid through the piping thereby opening the valve. The valve stem is rotated either manually or by means of a suitable actuator.

From time to time it is necessary to remove the valve stem actuation apparatus for maintenance and repair. When the valve stem actuation apparatus is returned to service, it is frequently impossible to determine the exact positioning of the valve member with respect to its fully opened and fully closed positions. This in turn leads to difficulty in determining with certainty when the valve member is in its fully closed position.

The present invention comprises a position sensing system which is particularly adapted for use with butterfly valves. By means of the invention, the precise positioning of the valve member of a butterfly valve with respect to its fully opened, partially opened, partially closed, and fully closed positions can be determined at any time.

The position sensing system of the present invention comprises a washer secured to the lower end of the valve stem of a butterfly valve. At least one magnet is mounted on the washer for rotation with the valve stem and the valve member mounted thereon. A sensor is mounted beneath the washer for actuation by the magnet. Upon actuation of the sensor, a signal indicative of the positioning of the valve member is generated.

BRIEF DESCRIPTION OF DRAWINGS

A more complete understanding of the invention may be had by reference to the following Detailed Description when taken in conjunction with the accompanying Drawings, in which.

DETAILED DESCRIPTION

Figure 1:
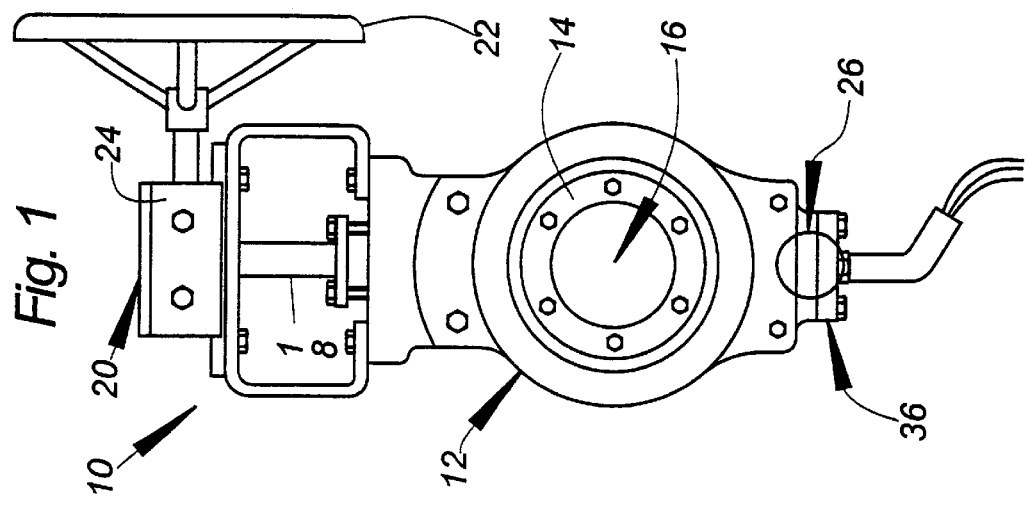
FIG. 1 is an end view of a butterfly valve incorporating the invention.

Referring now to the Drawings, and in particular to FIG. 1 thereof, there is shown a butterfly valve 10. The butterfly valve 10 includes a valve housing 12 having opposed flanges 14 situated at the opposite ends thereof. The flanges 14 are utilized to connect the butterfly valve 10 into a pipeline or other piping application.

A disk-shaped valve member 16 is positioned within the valve housing 12 and is supported upon a valve stem 18. Thus, upon rotation of the valve stem 18 about its axis, the valve member 16 is rotated relative to the valve housing 12 between a fully closed position wherein the valve member 16 extends perpendicularly to the flow of liquid through the valve housing 12 and a fully open position wherein the valve member 16 extends parallel to the flow of liquid through the valve housing 12.

The butterfly valve 10 further includes a valve actuation apparatus 20. The particular valve actuation apparatus 20 illustrated in FIG. 1 is adapted for manual operation and includes the hand wheel 22 which is utilized to open and close the butterfly valve 10 and a gear box 24 which operatively connects the hand wheel 22 to the valve stem 18. As is well known in the art, butterfly valves are adapted for other types of actuation, such as hydraulic actuation, electric actuation, etc. utilizing suitable actuators.

From time to time it is necessary to remove the valve actuation apparatus 20 in order that various component parts of the butterfly valve 10 can be serviced and/or repaired. When the valve actuation apparatus 20 is reinstalled, it is frequently impossible to determine with particularity the positioning of the valve member 16 within the valve housing 12. This in turn leads to difficulty in determining with certainty that the valve member 16 is fully closed. A determination that the valve member 16 is fully closed is frequently necessary for safety considerations and otherwise.

Figure 2:
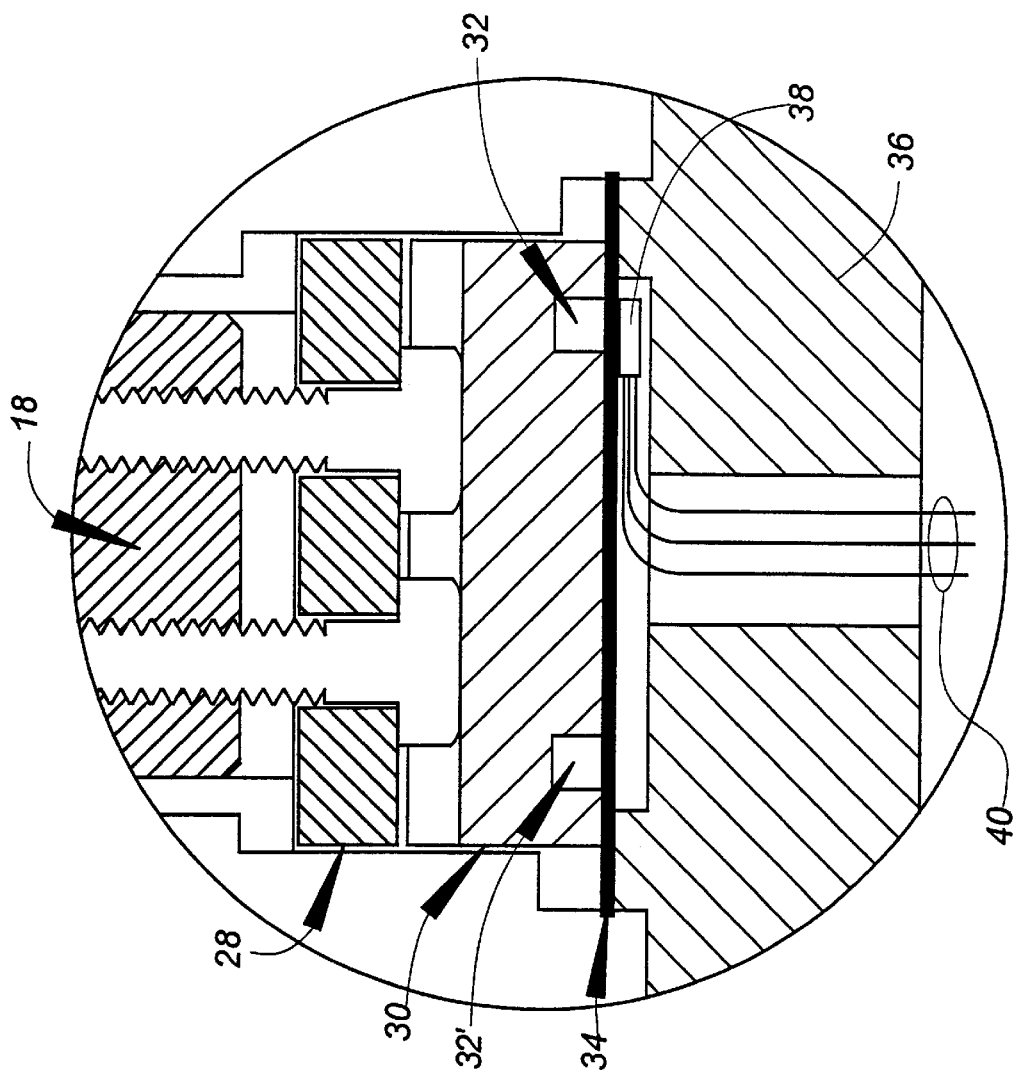
FIG. 2 is an enlarged partial sectional view of the lower portion of the butterfly valve of FIG. 1.

FIG. 2 comprises an enlarged sectional view of the portion of the butterfly valve 10 indicated by the circle 26 in FIG. 1. The valve stem 18 has a thrust bearing assembly 28 mounted at the lower end thereof. A washer 30 is situated beneath the thrust bearing assembly 28 and is connected thereto for rotation with the valve stem 18 and the valve member 16. At least one magnet 32 is mounted in or on the washer 30 for rotation with the valve stem 18 and the valve member 16. The magnet 32 may comprise either a permanent magnet or an electromagnet depending upon particular applications of the invention.

A seal 34 is situated between the washer 30 and a plate 36 which closes the lower end of the valve housing 12. A sensor 38 is situated to the underside of the seal 34 for actuation by the magnet 32. Upon actuation by the magnetic 32 the sensor 38 generates an output signal on leads 40.

In one application of the invention a single magnet 32 and a single sensor 38 are employed. Actuation of the sensor by the magnet indicates that the valve member of a butterfly valve is fully closed. In another application of the invention, four magnets 32 and four sensors 38 are mounted at equally spaced intervals. When all four sensors are actuated by the four magnets, the valve member of the butterfly valve is in its fully closed position. When three of the sensors are actuated, the valve member is in its partially closed position; when two of the sensors are acutated, the valve member is in its partially opened position; and when only one of the sensors is actuated, the butterfly valve is in its fully open position.

Those skilled in the art will understand that other arrangements of magnets and sensors can be utilized in the practice of the invention depending upon the requirements of particular applications thereof.

Although preferred embodiments of the invention are illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. In a valve comprising a valve housing having upper and lower ends, a valve member mounted within the housing, and a valve stem supporting the valve member within the housing for rotation between open and closed position and having upper and lower ends corresponding to the upper and lower ends of the valve housing, the improvement comprising:

a seal separating the lower end of the valve stem from the lower end of the valve housing;

signal generation means supported on the lower end of the valve stem for rotation with the valve member relative to the valve housing; and at least one sensor mounted on the valve housing on the housing side of the seal for actuation by the signal generating means to generate an output signal indicating that the valve member is in its fully closed position.

2. In a valve comprising a valve housing, a valve member mounted within the housing, and a valve stem supporting the valve member within the housing for rotation between open and closed position, the improvement comprising:

a plurality of signal generating means mounted on the valve stem for rotation with the valve member relative to the valve housing; and a plurality of sensors each positioned for actuation by the signal generating means to generate an output signal indicating that the valve member is in its fully closed position.

* * * * *